April 6, 1948.　　　T. P. WYMAN ET AL　　　2,439,232
INDUSTRIAL TRUCK AND TRAILER
Filed May 5, 1944　　　2 Sheets-Sheet 1
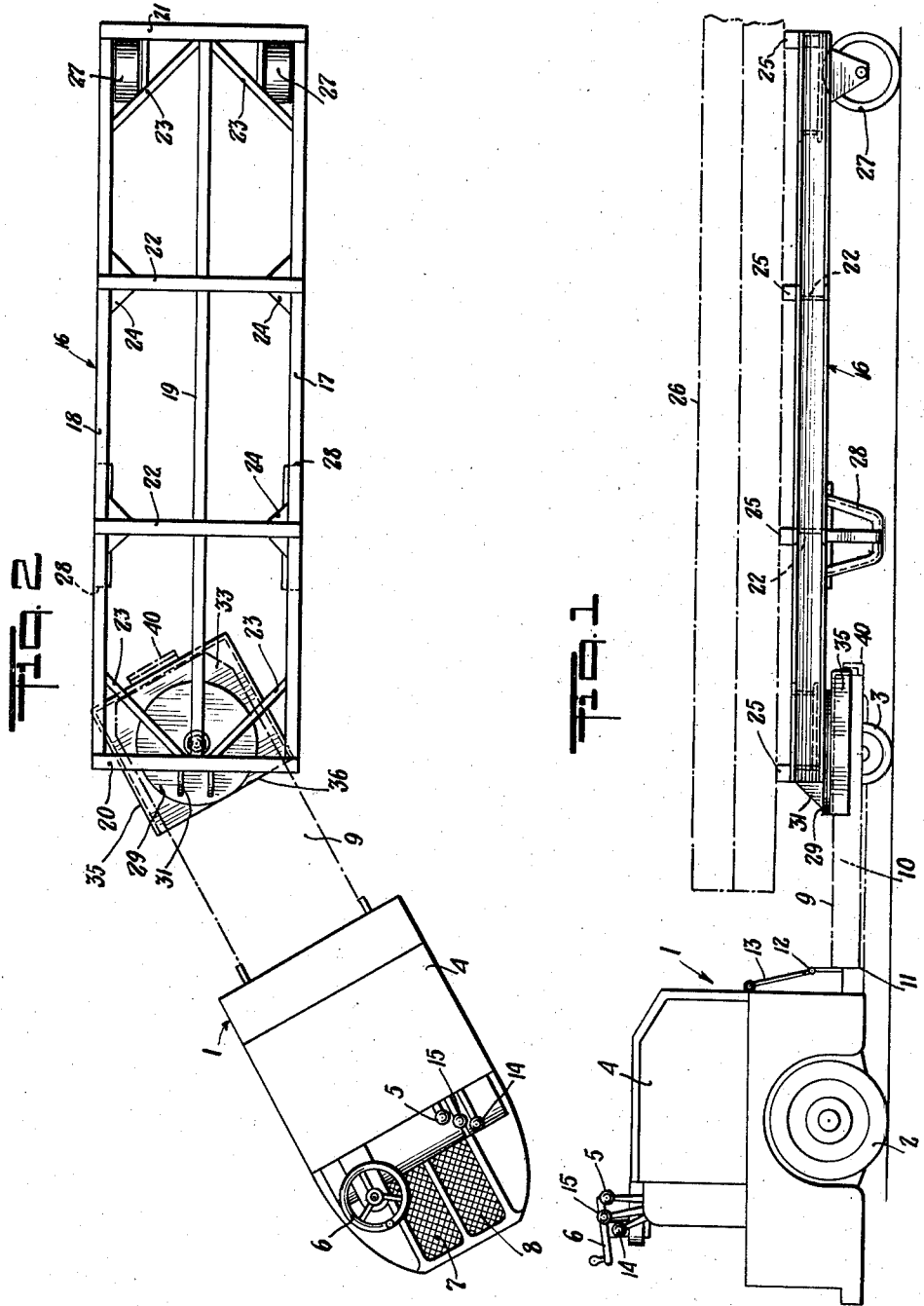
INVENTOR.
Thomas P. Wyman and
Peter B. Ruppe
BY
Pennie, Davis, Marvin & Edmonds
THEIR ATTORNEYS

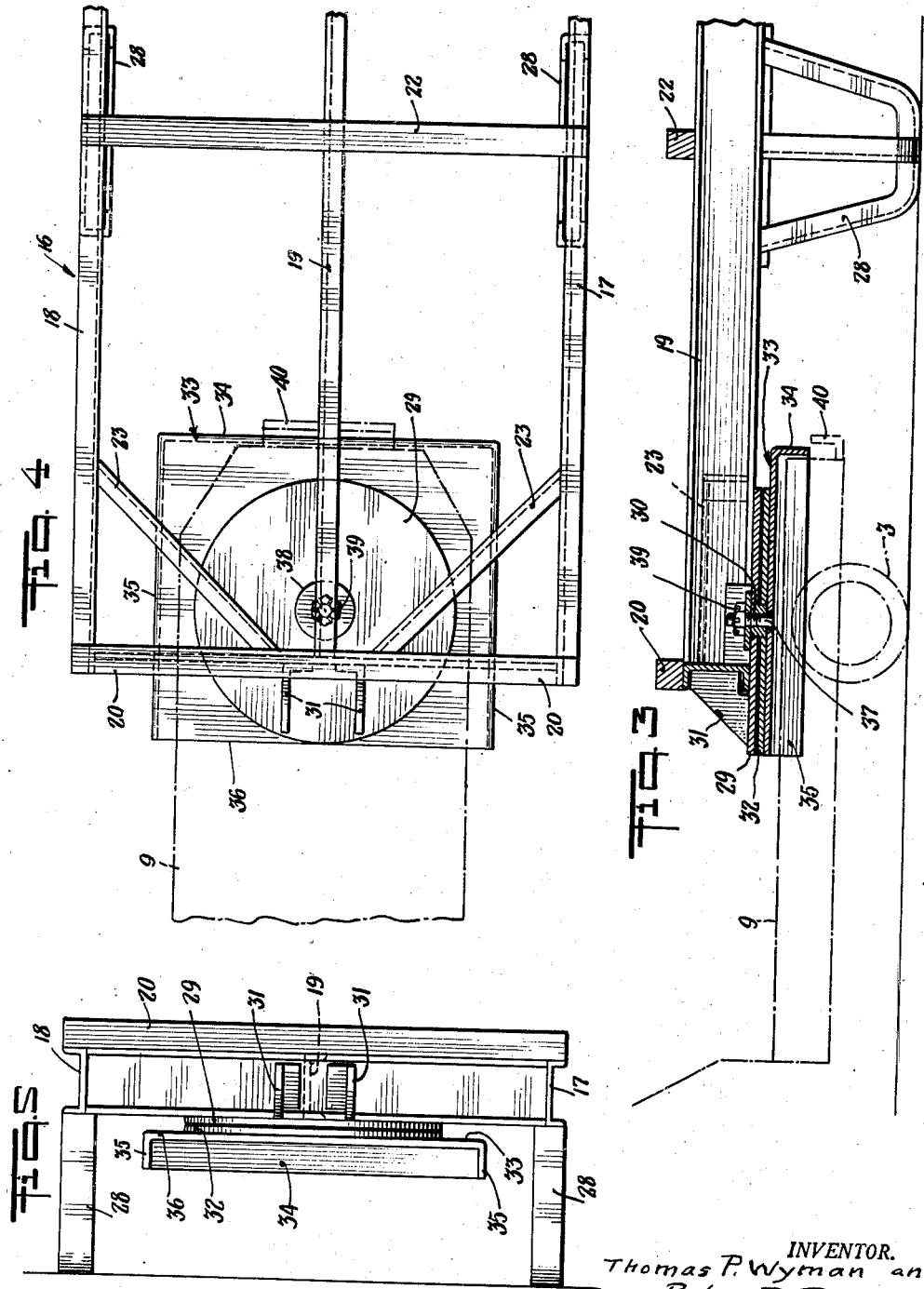

Patented Apr. 6, 1948

2,439,232

UNITED STATES PATENT OFFICE 2,439,232

INDUSTRIAL TRUCK AND TRAILER

Thomas P. Wyman, Suffern, and Peter B. Ruppe, Bronxville, N. Y.

Application May 5, 1944, Serial No. 534,198

5 Claims. (Cl. 280—33.1)

This invention relates to industrial trucks and trailers, and more particularly to two-wheeled trailers and industrial trucks of the platform type. The object of the invention is to provide an improved mechanism for connecting the platform of the truck to the trailer which is so constructed as to enable the truck to be used as a tractor to haul the trailer without interfering with its use as a truck when operating without the trailer. Stating it somewhat differently, the invention aims to adapt two-wheel trailers to be hauled by trucks of the lift platform type without impairing the utility of the truck for carrying loads upon its platform.

Another object of the invention is to provide an improved coupling mechanism which will effect the automatic coupling and uncoupling of the truck or tractor from a two-wheeled trailer so that these operations can be safely and satisfactorily performed by the manipulation of the truck by its operator without assistance from a second operator.

An embodiment of the invention has been illustrated in the accompanying drawings, although it will be understood that it is capable of various forms of mechanical expression. In these drawings:

Fig. 1 is a view in side elevation of a trailer and truck equipped with the improved coupling or connecting mechanism and coupled together ready to transport a load upon the trailer;

Fig. 2 is a plan view of the trailer and truck shown in Fig. 1, but traveling in a curve instead of moving straight ahead;

Fig. 3 is a vertical longitudinal section taken centrally through the forward end of the trailer to show the details of the improved coupling or connecting mechanism;

Fig. 4 is a plan view of the parts shown in Fig. 3; and

Fig. 5 is a view in end elevation of the trailer looking from the left of Fig. 4.

Referring now to these drawings, the industrial truck, indicated generally by numeral 1, is of the kind in common use for haulage around industrial plants. It is a motor vehicle usually of the order of about 10 feet long and from 3 to 4 feet wide so as to operate with facility through comparatively narrow aisles. It is provided with two driving wheels 2 under the forward end and two supporting wheels 3 at the platform end. Wheels 3 are usually smaller in diameter and have a narrower tread than drive wheels 2. The drive wheels may be powered by any suitable power source such as an electric motor, internal combustion engine, or combination of the two. In the industrial truck 1 shown in the drawings the driving wheels 2 are powered by an electric motor (not shown) which is geared to the drive wheels. This motor receives its power from an electric storage battery enclosed within a suitable housing 4. A suitable drive controller having an operating handle 5 is provided.

The truck is steered by means of a hand steering wheel 6 conveniently arranged with respect to the driver's position 7 and preferably operatively connected to turn all four wheels, that is, both drive wheels 2 as well as both platform wheels 3. A suitable brake mechanism is provided for stopping the truck and is preferably controlled by means of a foot pedal 8.

The truck is provided with a merchandise-carrying, lift platform 9 mounted over wheels 3 and occupying approximately one-half of the length of the truck. Its width is preferably less than that of the battery compartment 4 and its nose preferably has rounded corners as shown in Figs. 2 and 4. Platform 9 may be made of a heavy steel plate and preferably has deep side flanges 10 at each side to cover the lifting mechanism (not shown) which is mounted beneath the platform on an extension 11 of the truck frame on which wheels 3 are mounted. The platform lifting mechanism is arranged to raise the platform from 5 to 6 inches, or, in other words, from the dotted position of Fig. 1 to the full line position to facilitate the picking up of certain types of loads by the truck in a well understood manner.

It will be observed that the left hand or inner end of platform 9 is spaced five or six inches from the forward end of battery compartment 4. The raising and lowering mechanism of the platform is so constructed that as the platform raises it also shifts towards the battery compartment. For this reason the apron 12 at the inner end of platform 9 is provided with a hinged upper portion 13 which assumes substantially vertical position when the platform rises to its maximum elevation.

The operating mechanism (not shown) of platform 9 which is housed partly in frame extension 11 and partly beneath battery housing 4 operates in a well understood manner and is driven by any suitable power means such, for example, as an electric motor (not shown) which is separate from the truck driving motor. This electric motor may receive its power from the battery under regulation by a suitable controller having an operating handle 14 which is also arranged at the operator's position. The third handle 15 at this position is the reverse handle for reversing the direction of movement of the truck.

The trailer 16 may have any suitable dimensions, but preferably has about the same width as the widest portion of truck 1 and is preferably somewhat longer than the truck. It may comprise a frame consisting of longitudinal steel channel members 17 and 18 and a central longitudinal member 19, connected together by cross members 20 and 21 at the ends, together with intermediate cross members 22 preferably of I beam section. The frame may be braced with diagonal members 23 at the ends and by gussets 24 at the junctions between the cross members 22 and side members 17 and 18. The trailer may be provided with a platform for supporting this load, although as illustrated it merely has a series of cross supports 25 which are secured on top of the longitudinal frame members 17, 18 and 19 and on which a load of elongated structural members such as the wooden or steel beams indicated by numeral 26 in Fig. 1 may rest.

At the rear the trailer is provided with two wheels 27 which are journaled in any suitable manner to members secured to the frame. It is also provided with a pair of skids 28 to support the forward end of the trailer when it is not coupled to the truck 1.

Referring now to Figs. 3, 4 and 5 of the drawings a circular disk 29 cut, for example, from a piece of heavy steel plate, is secured centrally of the front end of trailer 16 beneath the central longitudinal frame member 19, front cross member 20 and braces 23. Disk 29 may be fixed to these parts in any suitable way, as, for example, by welding. Disk 29 is provided with a centrally located aperture to receive a king pin 30, and in order to place this pin as near as possible to the front end of the trailer, the forward edge of disk 29 preferably projects somewhat in front of cross member 20. To reinforce such projecting portion of disk 29, a pair of angular web members 31 may be welded to it and to the cross member 20.

Beneath the stationary supporting disk member 29 which constitutes an upper fifth wheel there is a similar but relatively rotatable member 32 which constitutes the lower fifth wheel. This member is preferably of the same diameter as member 29 and may be of similar material. It also has a centrally located aperture to receive king pin 30. Since the entire weight of the forward half of the trailer 16 is supported by members 29 and 32 resting upon one another and since these members turn with respect to one another about king pin 30 while sustaining such weight, provision is made for adequate greasing or lubrication of their coacting surfaces.

Beneath disk 32 and supporting this disk there is another plate-like member 33, rectangular in shape to correspond with the shape of the outer or nose portion of platform 9 of the truck. Plate 33 forms a bearing member which has a relatively large under surface adapted to rest upon the merchandise-carrying platform of the truck and thereby support the front end of the trailer. It also is provided with a downwardly extending rear flange 34 and with two similar side flanges 35. The forward edge 36 of member 33, however, is not flanged. As hereinafter described the rear flange 34 functions as a stop and as a coupling member to cooperate with a coupling member carried by the platform 9 to couple the truck and trailer together.

In order to inseparably secure together the several members of the mechanism above described, a securing pin 37 is provided which passes through a central aperture in king pin 30. This securing pin may be welded, as indicated in Fig. 3, at its lower end to the supporting and coupling member 33 and its upper end may be provided with a large washer 38 and with a nut 39 which is positively locked with respect to pin 37 in some suitable manner. Thus, for example, nut 39 may be castellated and the upper end of pin 37 drilled to receive a cotter pin. The forward end of central longitudinal member 19 may be cut away as shown in Fig. 3, in order to accommodate the upper end of pin 37 and nut 39.

Thus the improved coupling or connecting mechanism between the trailer and truck platform 9 comprises a complete fifth wheel mechanism, all parts of which are inseparably secured to the trailer 16. It also includes combined supporting and coupling means, one member of which, indicated by numeral 33, constitutes a part of the fifth wheel mechanism, and the other member of which is a hook member 40 which is fixed to the end or nose of truck platform 9.

In order to couple the truck 1 to the trailer 16, platform 9 is lowered to its lowermost position and the truck is manipulated to place the nose and outer portion of the platform between said flanges 35 of supporting member 33. Flanges 35 serve as guides for the platform as the end of the platform is brought into engagement with rear flange 34 which serves as a stop. Platform 9 being in its lowermost position, the upper edge of hook or coupling member 40 is free to pass beneath the lower edge of the coupling flange 34. If, as is usually the case, member 33 is askew with respect to the truck platform 9, the contact of the end of the platform with flange or stop 34 causes member 33 to swing about king pin 30 so as to square up member 33 with the platform. This places hook member 40 at the rear of and parallel with flange 34, as shown in Figs. 3 and 4.

Thereupon controller handle 14 is operated to raise platform 9 until the lower face of supporting member 33 rests upon the surface of the platform. During this movement, hook member 40 enters into interlocking engagement with flange 34 to supplement the frictional engagement between the platform and member 33 in transmitting the motion of the truck to the trailer in hauling, backing or turning. The upward movement of platform 9 is continued until there is sufficient clearance between skids 28 and the floor, pavement or roadway, for practical operation of the trailer and truck as a unit. Thus platform 9 may be raised to its maximum height or to some intermediate level, depending upon the irregularities to be encountered in the roadway in the course of the haul. The truck may be uncoupled from the trailer by reversing the procedure just described. From the above it will be understood that the truck can be easily manipulated by its operator to couple onto a trailer, haul it to its destination, and uncouple the truck therefrom, without the aid of a second operator.

It will be observed that the distance from the center of king pin 30 to flange 34 of member 33 corresponds to the dimension of the truck between the rear edge of platform 9 and the center line of platform wheels 3. Though not necessary, this is desirable in order to prevent sidewise motion of the forward end of trailer 16 whenever the truck and trailer unit enters a curve, that is to say, when the truck or tractor 1 swings to some such position as shown in Fig. 2. Furthermore the width of supporting member 33 between flange 34 and its opposite edge 36 is sufficient to distribute the weight of the load over a reasonably large area of platform 9 rather than concentrating it at a point within a comparatively small area.

The mechanism of the present invention enables the weight of one-half of the trailer and its load to be successfully carried by the platform 9 of the truck without subjecting the supporting mechanism of the platform to undue stresses. Moreover, the addition of the coupling hook member 40 to the rear end of platform 9 in no way interferes with the utility of the truck 1 as a truck rather than as a tractor, that is, in being used separately from trailer 16 for the purpose of the haulage of loads on platform 9. In such instances, the merchandise to be hauled is carried on the upper flat surface of the platform.

It will be understood that the accompanying drawings and above description serve to exemplify only one embodiment of the invention and that various changes may be made in the construction without departing from the spirit of the invention, the scope of the invention being indicated in the appended claims.

We claim:

1. In a truck and trailer unit, a truck having a platform which can be raised or lowered and a coupling member on the nose of said platform, a trailer having a fifth wheel mechanism inseparably secured thereto and comprising a fixed and a rotatable member, said rotatable member having parallel guides spaced from one another by a distance somewhat greater than the width of the truck platform and a stop member at right angles to said guides, said guides being adapted to coact with the sides of the truck platform when the nose of the platform is moved under the fifth wheel mechanism and the rear edge of the platform coacting with said stop thereby automatically orienting said rotatable member to place said stop member and said coupling member in position to engage one another when the truck platform is raised.

2. A trailer having secured to the front end thereof a fifth wheel mechanism having superimposed weight-supporting members fixed in relatively rotatable relation and a coupling member comprising a flat rectangular plate having downwardly extending flanges at its opposite sides and rear end, said coupling member being fixed beneath the lower weight-supporting member of said fifth wheel mechanism, a tractor having an upwardly shiftable platform provided with a rectangular rear portion adapted to be received within and beneath said coupling member with its sides between the side flanges thereof and its rear end adjacent the rear flange thereof, and an upwardly projecting hook member fixed to the rear end of said platform adapted to engage the said rear flange when the platform is raised.

3. In a truck and trailer unit, a truck having a platform which can be raised or lowered and a coupling member on the nose of said platform, a trailer having a fifth wheel mechanism inseparably secured thereto and comprising a fixed and a rotatable member, a second coupling member on said rotatable member, said rotatable member having parallel guides spaced from each other by a distance somewhat greater than the width of the truck platform and a stop member at right angles to said guides, said guides being adapted to coact with the sides of the truck platform when the nose of the platform is moved under the fifth wheel mechanism, the rear edge of the platform coacting with said stop thereby automatically orienting said rotatable member to place said coupling members in position to engage each other when the truck platform is raised.

4. In a truck and trailer unit, a truck adapted to carry merchandise independently of the trailer and having a platform having a flat merchandise-carrying surface which is capable of being raised and lowered, a fifth wheel mechanism secured solely to the trailer and including a platform engaging member adapted to rest upon said flat surface of the truck platform and to support the front end of the trailer therefrom, coupling means carried by said member, and coupling means carried by said platform, said respective coupling means automatically cooperating to couple the truck and trailer together when said platform is placed in its normal position beneath the platform-engaging surface and raised, and automatically uncoupling when said platform is lowered, the coupling means carried by said member being removed from and fixedly carried outwardly beyond the platform-engaging surface and the coupling means carried by the platform being removed from and fixedly carried outwardly beyond and below the merchandise-carrying surface thereof, whereby no portion of the cooperating coupling means at any time extends above the merchandise-carrying surface of the truck platform to interfere with the placing of merchandise thereon.

5. A trailer unit, for attachment to a truck having a flat merchandise-carrying surface which is capable of being raised and lowered and which is adapted to support the forward end of the trailer, comprising a complete fifth wheel mechanism, a member, for supporting the forward end of the trailer from such a truck, having a platform-engaging surface adapted to rest upon the flat merchandise-carrying surface of the truck platform, and vertically-coupleable coupling means fixedly carried by said member outwardly beyond its platform-engaging surface, said coupling means being adapted to so cooperate with vertically-coupleable coupling means carried outwardly beyond and below the flat merchandise-carrying surface of the truck that when said platform of the truck is placed in its normal trailer-supporting position beneath the platform-engaging surface of said member and raised, the truck and trailer automatically will be coupled, and when the platform is lowered the truck and trailer automatically will be uncoupled, whereby said trailer may be connected to a truck having a flat merchandise-carrying, trailer-supporting surface which never is interrupted by coupling means extending thereabove which would interfere with the placing of merchandise thereon.

THOMAS P. WYMAN.
PETER B. RUPPE.

REFERENCES CITED

The following references are of record in the file of this patent:

UNITED STATES PATENTS

| Number | Name | Date |
|---|---|---|
| 1,424,788 | Westlake et al. | Aug. 8, 1922 |
| 1,706,425 | Vested | Mar. 26, 1929 |
| 1,948,677 | Robin | Feb. 27, 1934 |